United States Patent
Ash et al.

(10) Patent No.: US 9,396,102 B2
(45) Date of Patent: Jul. 19, 2016

(54) RECOVERY FROM CACHE AND NVS OUT OF SYNC

(75) Inventors: Kevin John Ash, Tucson, AZ (US); Michael Thomas Benhase, Tucson, AZ (US); Lokesh Mohan Gupta, Tucson, AZ (US); Kenneth Wayne Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 13/617,076

(22) Filed: Sep. 14, 2012

(65) Prior Publication Data

US 2014/0082254 A1   Mar. 20, 2014

(51) Int. Cl.
  *G06F 12/08*   (2016.01)
  *G06F 11/16*   (2006.01)
  *G06F 12/02*   (2006.01)
  *G06F 11/00*   (2006.01)
  G06F 11/14   (2006.01)
  G06F 11/20   (2006.01)

(52) U.S. Cl.
  CPC .......... *G06F 12/0238* (2013.01); *G06F 11/004* (2013.01); *G06F 12/0871* (2013.01); *G06F 11/1441* (2013.01); *G06F 11/1666* (2013.01); *G06F 11/20* (2013.01); *G06F 2212/286* (2013.01)

(58) Field of Classification Search
  CPC ............ G06F 12/0815; G06F 12/0871; G06F 12/0888; G06F 11/004; G06F 11/1471; G06F 11/1666; G06F 2212/286
  USPC ........... 711/126, 144, 154, E12.019, E12.026
  See application file for complete search history.

(56) References Cited

U.S. PATENT DOCUMENTS

| | | | |
|---|---|---|---|
| 6,658,542 B2 | 12/2003 | Beardsley et al. | |
| 6,715,030 B1 | 3/2004 | Vandenbergh et al. | |
| 6,928,521 B1* | 8/2005 | Burton et al. | 711/144 |
| 6,988,171 B2 | 1/2006 | Beardsley et al. | |
| 7,000,083 B2 | 2/2006 | Jarvis et al. | |
| 7,287,139 B2 | 10/2007 | Budaya et al. | |
| 7,849,254 B2* | 12/2010 | Ash et al. | 711/103 |
| 8,176,363 B2 | 5/2012 | Zlotnick | |
| 8,549,230 B1* | 10/2013 | Chatterjee et al. | 711/135 |
| 2003/0070041 A1* | 4/2003 | Beardsley et al. | 711/113 |
| 2012/0047342 A1 | 2/2012 | Grusy et al. | |

* cited by examiner

*Primary Examiner* — Hal Schnee
(74) *Attorney, Agent, or Firm* — Griffiths & Seaton PLLC

(57) ABSTRACT

For cache/data management in a computing storage environment, incoming data segments into a Non Volatile Storage (NVS) device of the computing storage environment are validated against a bitmap to determine if the incoming data segments are currently in use. Those of the incoming data segments determined to be currently in use are designated to the computing storage environment to protect data integrity.

12 Claims, 4 Drawing Sheets

RECOVERY FROM CACHE AND NVS OUT OF SYNC

BACKGROUND OF THE INVENTION

1. Field of the Invention

The present invention relates in general computing systems, and more particularly to systems for increased cache and data management efficiency in computing storage environments.

2. Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written. Computer systems also may include Non Volatile Storage (NVS) systems to retain data in the event of power loss or equipment failure.

SUMMARY OF THE INVENTION

As one of ordinary skill in the art will appreciate, it is necessary for computing environments having cache memory structures and NVS systems to synchronize function in order to maintain the correct data flow and ensure data integrity. When Cache/NVS get out of sync with certain data segments, modified sectors, or NVS control blocks used for tracks, for example, various problems and panics occur while trying to recover, pin, or discard the NVS track.

For example, if Cache believes an NVS segment has been freed, Cache may reallocate the segment for another track. Since NVS is still using the segment to hold modified data for the first track, the data in NVS for the first will be overlaid by the second track. Since data is typically destaged from Cache to disk (and the data in NVS then discarded), the double use of NVS segments may not always be immediately detected. However, if a failover were to occur (due to a hardware, power or other resource failure, for example), data loss would result, since the data in NVS is corrupt. A need exists for a mechanism to ensure recovery (including retention of critical data structures) in the event that the NVS and Cache become out of sync.

Accordingly, and in view of the foregoing, various embodiments for cache/data management in a computing storage environment by a processor device, are provided. In one embodiment, by way of example only, a method for cache/data management in a computing storage environment by a processor device is provided. Incoming data segments into a Non Volatile Storage (NVS) device of the computing storage environment are validated against a bitmap to determine if the incoming data segments are currently in use. Those of the incoming data segments determined to be currently in use are designated to the computing storage environment to protect data integrity.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, as one of ordinary skill in the art will appreciate, it is necessary for computing environments having cache memory structures and NVS systems to synchronize function in order to maintain the correct data flow and ensure data integrity. When Cache/NVS get out of sync with certain data segments, modified sectors, or NVS control blocks used for tracks, for example, various problems and panics occur while trying to recover, pin, or discard the NVS track.

For example, if Cache believes an NVS segment has been freed, Cache may reallocate the segment for another track. Since NVS is still using the segment to hold modified data for the first track, the data in NVS for the first will be overlaid by the second track. Since data is typically destaged from Cache to disk (and the data in NVS then discarded), the double use of NVS segments may not always be immediately detected. However, if a failover were to occur (due to a hardware, power or other resource failure, for example), data loss would result, since the data in NVS is corrupt. A need exists for a mechanism to ensure recovery (including retention of critical data structures) in the event that the NVS and Cache become out of sync.

The mechanisms of the illustrated embodiments serve to provide information to various storage components (such as the aforementioned Cache) that data segments are still in use, such that in the event that NVS and other hardware components are out of sync, those hardware components are made aware of the data segments in use so as to ensure data integrity. As previously mentioned, in one of the exemplary embodiments, incoming data segments into the NVS may be validated against a bitmap to determine if the incoming data segments are currently in use. If so, they are designated to the Cache as such. In this manner, the NVS effectively detects corruption before it is allowed to occur. In all cases, the out of sync data segments may be pinned and reported as data loss to prevent data integrity issues.

Figure 1:
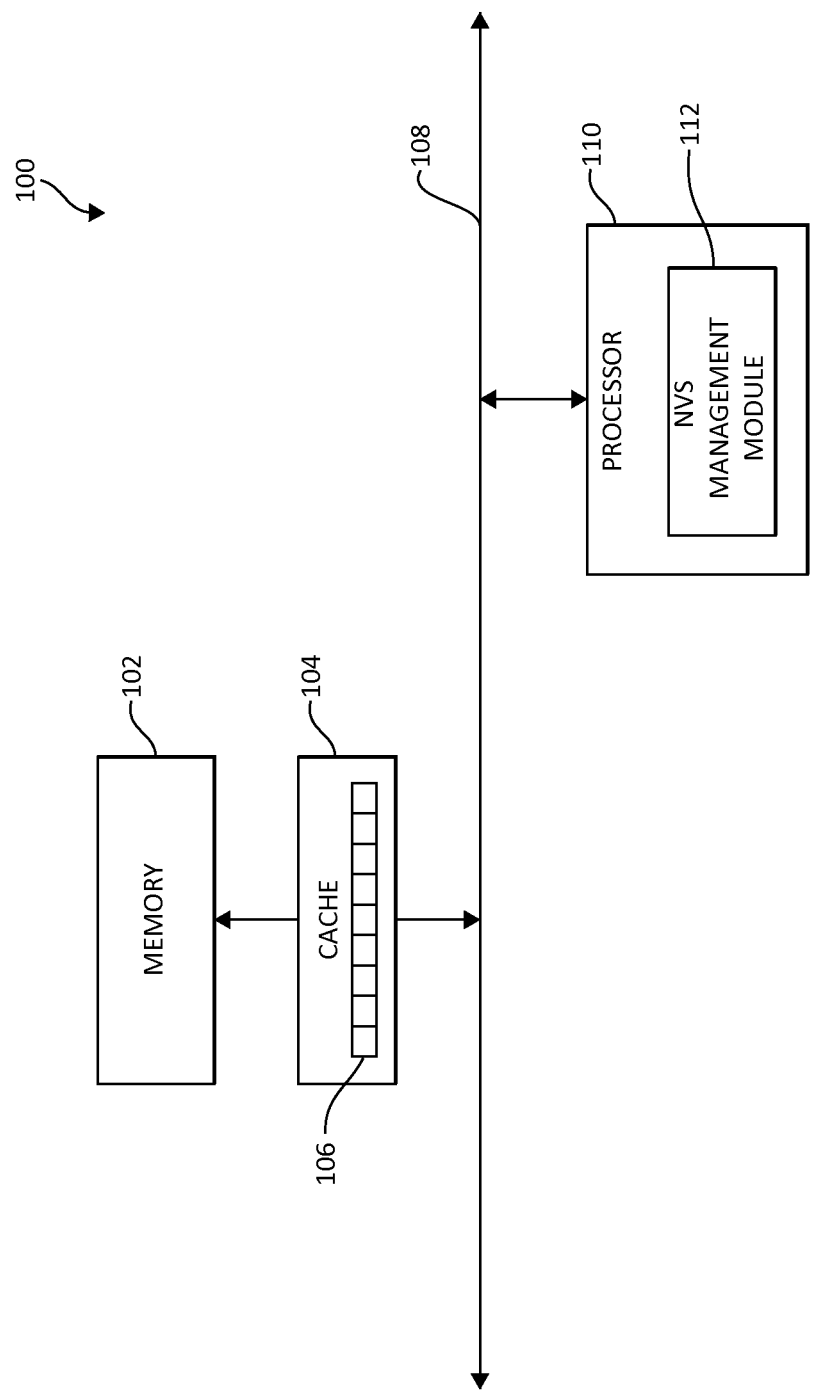
FIG. 1 is an exemplary block diagram showing a hardware structure for cache/data management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a NVS management module 112, which comprises computer-readable code that, when executed by processor 110, causes processor 110 to perform data management operations in accordance with the present invention. In the various embodiments, processor 110 is configured for validating incoming data segments into a Non Volatile Storage (NVS) device of the computing storage environment against a bitmap to determine if the incoming data segments are currently in use, and designating those of the incoming data segments determined to be currently in use to the computing storage environment to protect data integrity.

In various other embodiments, processor 110 is configured for configuring the bitmap.

In various other embodiments, processor 110 is configured for performing the validating by an NVS Network Adapter (NA) associated with the NVS device.

In various other embodiments, processor 110 is configured for performing the validating by comparing an incoming Non Volatile Storage Control Block (NVSCB) against the bitmap.

In various other embodiments, processor 110 is configured for, pursuant to designating those of the incoming data segments, performing at least one of pinning and reporting the designated incoming data segments as data loss.

In various other embodiments, processor 110 is configured for, at one of an Initial Memory Load (IML) and a Warmstart, clearing and rebuilding the bitmap.

Figure 2:
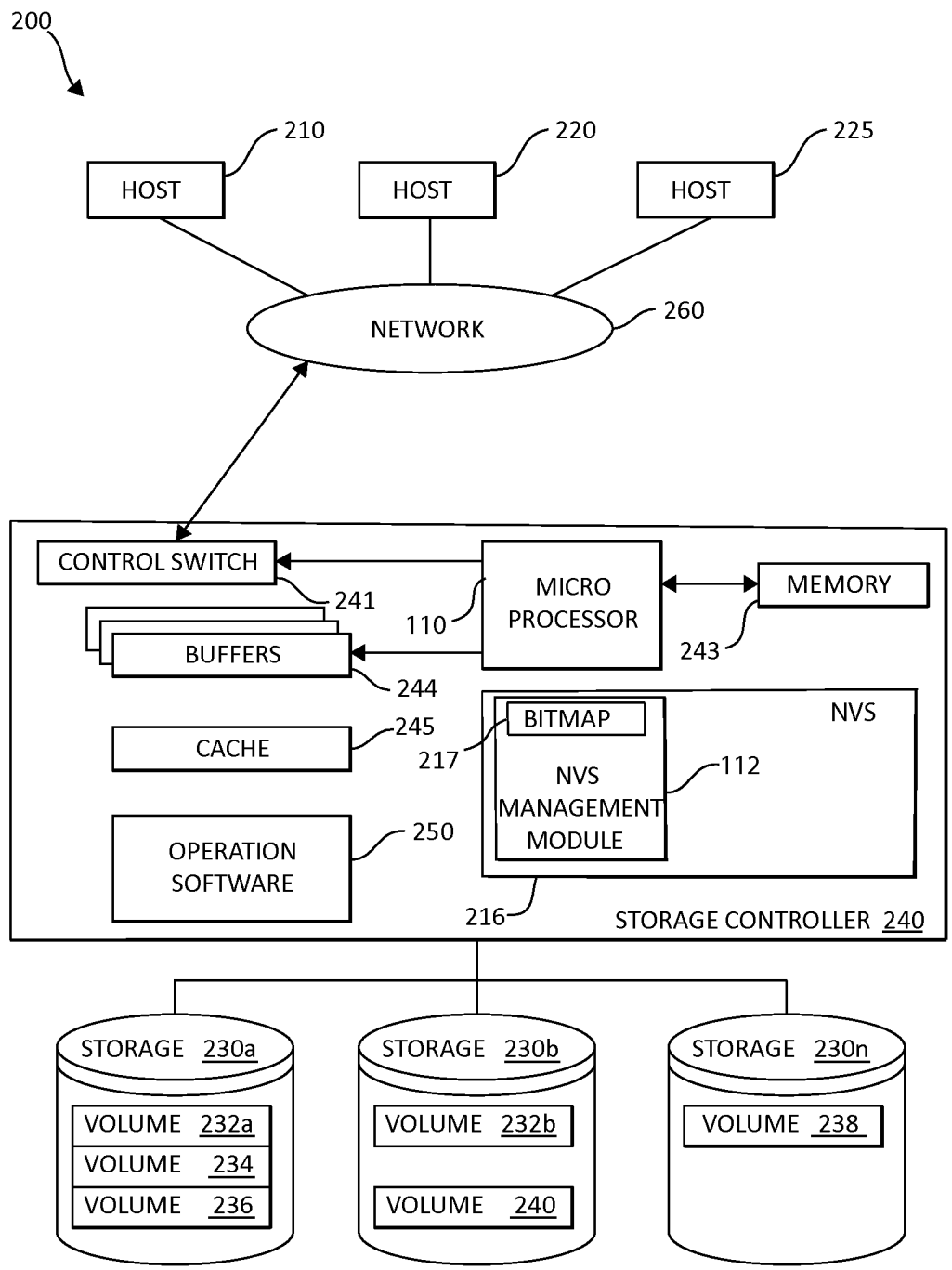
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the microprocessor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The NVS 216 may include a NVS management module 112. The NVS management module 112 may work in conjunction with each and every component of the storage controller 240, the hosts 210, 220, 225, and other storage controllers 240 and hosts 210, 220, and 225 that may be remotely connected via the storage fabric 260. NVS management module 112 may be structurally one complete module or may be associated and/or included with other individual modules. NVS management module 112 may also be located in the other components of the storage controller 240.

NVS management module 112 includes a bitmap 217, whose functionality will be further described in detail, following. For purposes of the instant discussion, however, bitmap 217 serves as a validation tool, in which existing data segments in NVS are compared against incoming data segments to determine which, if any, of the incoming data segments are currently in use.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the NVS management module 112, in which information may be set. The multiple buffers 244 may be implemented to assist with the methods and steps as described herein.

Figure 3:
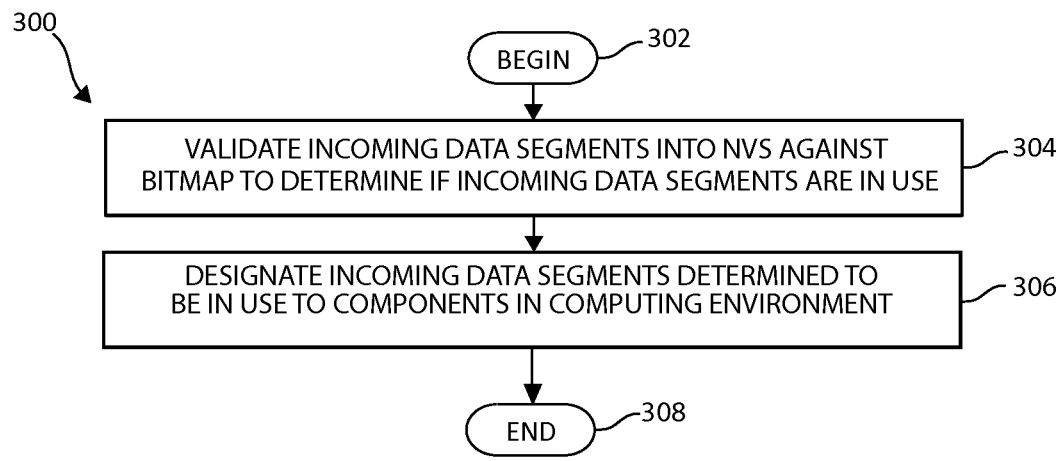
FIG. 3 is a flow chart diagram illustrating an exemplary method for increased efficiency in cache and data management, again in which aspects of the present invention may be realized.

Turning now to FIG. 3, a flow chart diagram, illustrating an exemplary method 300 for data management in which aspects of the present invention are incorporated, is depicted. Method 300 begins (step 302). Incoming data segments (e.g., tracks) into NVS storage are validated against a bitmap to determine if the incoming data segments are in use (step 304). Those of the incoming data segments that are identified as such are designated to components in the computing environment (step 306). The method 300 then ends (step 306).

Figure 4:
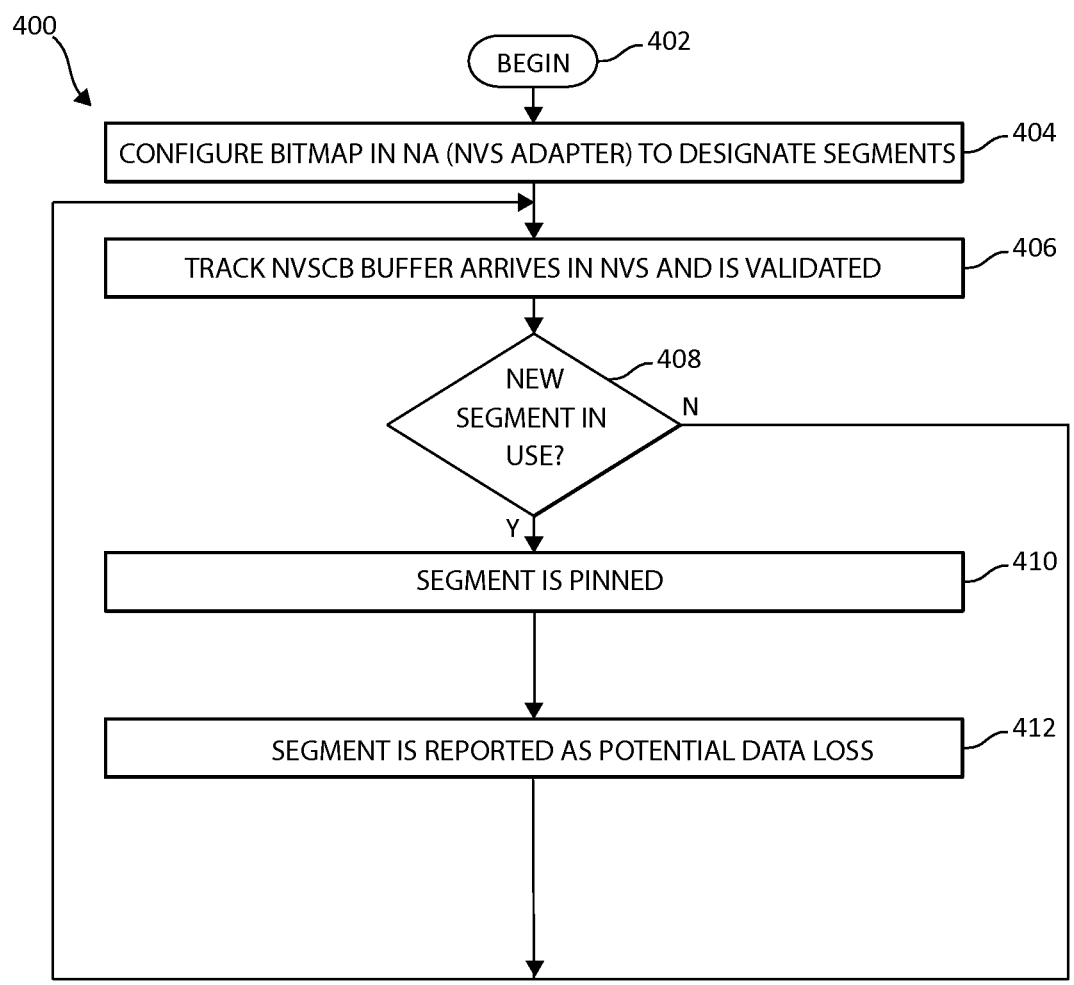
FIG. 4 is an additional flow chart diagram illustrating an exemplary method for operation in which aspects of the present invention may be realized.

FIG. 4, following, is an additional flow chart diagram depicting an exemplary method 400 of operation of various storage components in accordance with the present invention. Method 400 begins (step 402) with the configuration of a bitmap in the NVS network adapter (NA) code to designate segments in use (step 404). In one exemplary embodiment, this bitmap is implemented as a structure per 16 MB Logical Memory Block (LMB) in the computing storage environment.

Again, in one exemplary embodiment, during an Initial Memory Load (IML) and Warmstart operation, the bitmap is cleared and rebuilt with the modified Non Volatile Storage Control Blocks (NVSCBs). For each NVSCB, the bit corresponding to each used segment is tuned on.

When a track NVSCB Buffer arrives in NVS, the NA code validates that the new segments are not currently in use in the bitmap (step 406). If any segment is currently in use (step 408), then the NA code has detected corruption before it is allowed to occur (e.g., the Non Volatile component believes that a segment is FREE while a NA component knows it is IN-USE). Once the segment is identified, the segment is pinned (step 410), and the segment is reported as potential data loss (step 412). The method 400 then continues (returning to step 406).

In one exemplary embodiment, if an out-of-sync scenario is identified, once the Commit or Abort for the Track NVSCB Buffer is complete, the NA code will panic to drive a warmstart to get the NA and NVS back in sync for the used segments.

NA and NV can get out of sync if NA is told Commit (e.g., keep the segments) and Cache/NV is told Abort (e.g., free the segments). When NA Discards a track, the bits in the bitmap for each discarded segment are verified to be on, then turned off. When NA Commits a track, the bits in the bitmap for each kept segment are verified to be off, then turned on.

Figure 5:
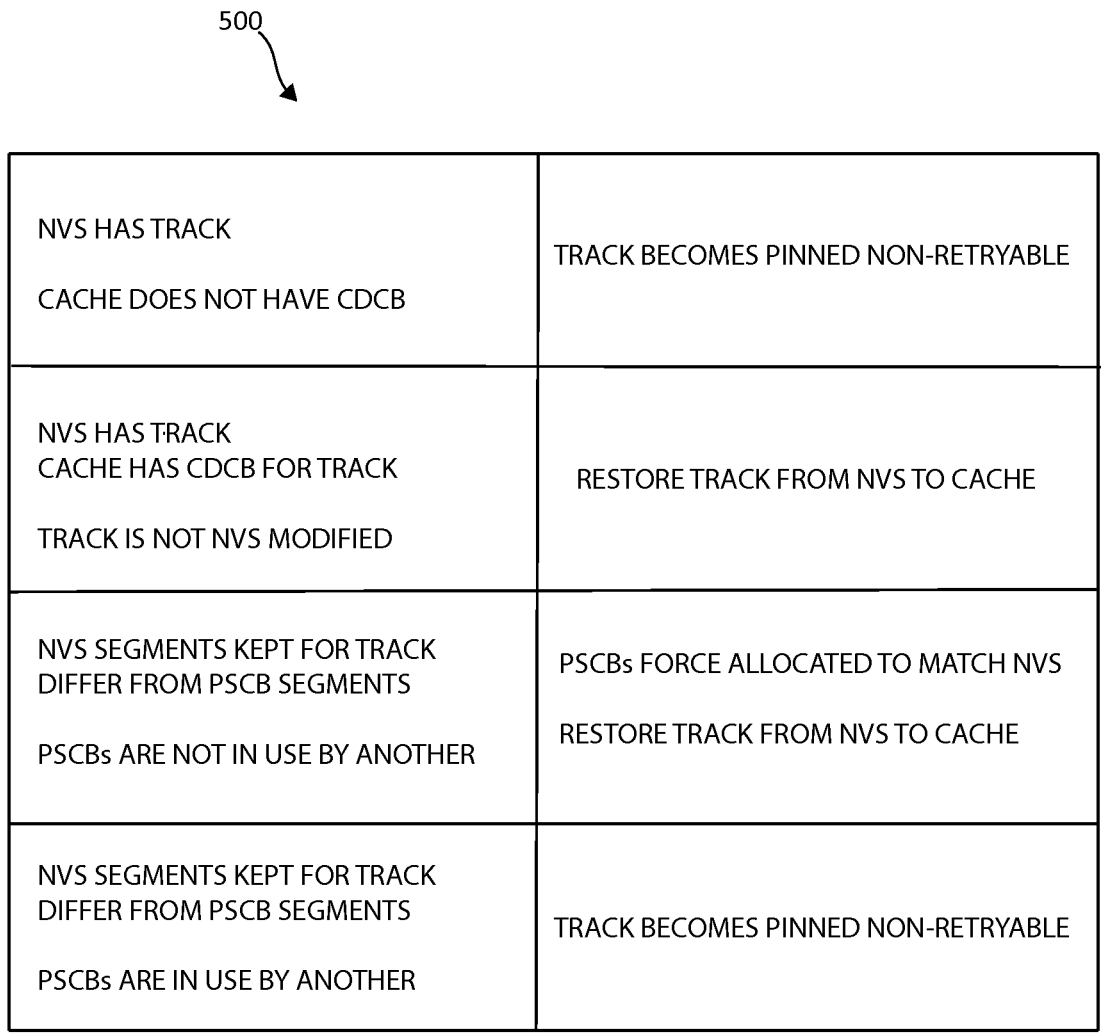
FIG. 5 is a table diagram of exemplary rules for use during a recovery operation in the computing storage environment.

In FIG. 5, following, a table 500 of exemplary rules to be employed during a Warmstart NVSCB Recovery operation is depicted. In a first situation, if NVS has a track, and Cache does not have a CDCB for the track, then the track is Pinned Non-Retryable. In a second situation, if NVS has a track and Cache has a CDCB for the track, but the track is not NVS modified, then the track is restored from NVS to Cache.

In a third situation, if the NVS segments kept for a track are different from the Primary Segment Control Block (PSCB) segments for a track, and the PSCBs are not in use by another track, then the PSCBs are force allocated to match NVS, and the track is restored from NVS to Cache. In a fourth situation, if the NVS segments kept for a track are different from the PSCB segments for the track and the PSCB segments are in use by another track, the track is made Pinned Non-Retryable.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for data management in a computing storage environment, comprising:
a Non Volatile Storage (NVS) device; and
a processor device, in operable communication with the NVS device, wherein the processor:
validates incoming data segments into the NVS device against a bitmap to determine if the incoming data segments are currently in use by the computing storage environment,
pinning those of the incoming data segments determined to be currently in use by the computing storage environment, and
reporting the pinned incoming data segments determined to be currently in use by the computing storage environment to a cache, to protect against double use and corruption of the incoming data segments.

2. The system of claim 1, further including the bitmap.

3. The system of claim 1, wherein the bitmap is configured as at least one of a plurality of data structures per-Logical Memory Block (LMB) in the computing storage environment.

4. The system of claim 3, wherein the at least one of the plurality of data structures includes the bitmap and a lock.

5. The system of claim 1, further including a NVS Network Adapter (NA) associated with the NVS device for performing the validating.

6. The system of claim 1, wherein the processor performs the validating by comparing an incoming Non Volatile Storage Control Block (NVSCB) against the bitmap.

7. The system of claim 1, wherein the processor device, at one of an Initial Memory Load (IML) and a Warmstart, clears and rebuilds the bitmap.

8. A computer program product for data management by a processor device in a computing storage environment, the computer program product comprising a non-transitory computer-readable storage medium having computer-readable program code portions stored therein, the computer-readable program code portions comprising:
a first executable portion that validates incoming data segments into a NVS device against a bitmap to determine if the incoming data segments are currently in use by the computing storage environment;
a second executable portion that pins those of the incoming data segments determined to be currently in use by the computing storage environment; and
a third executable portion that reports the pinned incoming data segments determined to be currently in use by the computing storage environment to a cache, to protect against double use and corruption of the incoming data segments.

9. The computer program product of claim 8, further including a fourth executable portion that configures the bitmap.

10. The computer program product of claim 8, further including a fourth executable portion that configures the bitmap as at least one of a plurality of data structures per-Logical Memory Block (LMB) in the computing storage environment.

11. The computer program product of claim 8, further including a fourth executable portion that performs the validating by comparing an incoming Non Volatile Storage Control Block (NVSCB) against the bitmap.

12. The computer program product of claim 8, further including a fourth executable portion that, at one of an Initial Memory Load (IML) and a Warmstart, clears and rebuilds the bitmap.

* * * * *